July 16, 1940.        F. A. GAUGER        2,207,979
HEATING SYSTEM
Filed April 7, 1937

INVENTOR.
Frank A. Gauger
BY
Arthur R. Woolfolk
ATTORNEY.

Patented July 16, 1940

2,207,979

UNITED STATES PATENT OFFICE 2,207,979

HEATING SYSTEM

Frank A. Gauger, Milwaukee, Wis., assignor to Minneapolis-Honeywell Regulator Company, Minneapolis, Minn., a corporation of Delaware Application April 7, 1937, Serial No. 135,419

3 Claims. (Cl. 236—10)

This invention relates to a heating system and is particularly directed to a hot air system.

In hot air systems as heretofore known it is the usual practice to put the furnace under the control of a room thermostat and also under the control of a limit thermostat so that the temperature of the air immediately adjacent the furnace is limited to a certain definite maximum. As a consequence of this, it is apparent that when a front door or window is opened for instance, and cold air suddenly enters the house, there is no response of the controls to this entering cold air. It does not arrive at the room thermostat for a material length of time and not at all until it is picked up and mixed with the hot air in the house and finally lowers the general temperature of substantially the entire volume of air in the house, at which time the room thermostat will respond but the temperature of the air throughout the entire house has been lowered prior to the response of the room thermostat.

Another defect of the heretofore known systems is that when the limit control is set for a certain outside air temperature, for instance for extremely cold weather, and the room thermostat calls for more heat, that the furnace will heat up until either the room thermostat responds or the limit control responds. On the other hand, if the outside temperature is fairly mild and the room thermostat calls for increase in heat, it is obvious that the furnace will over shoot as the room thermostat does not respond until the major volume of air throughout the house is of the temperature for which the room thermostat is set. Consequently the limit thermostat at the furnace will allow the furnace to heat up to a point that was suitable for extremely cold weather with the ultimate result that the house will be considerably overheated. Obviously the reverse is true, for if the limit control was set for mild weather, it would be a practical impossibility for the furnace to heat the house to the desired temperature.

This invention is designed to overcome the above noted defects, and objects of this invention are to provide a novel system of heating in which substantially instantaneous response to any variation is obtained, in which the main control thermostat or temperature responsive control member is located in the cold air return preferably adjacent the furnace, and in which a limit control is employed in conjunction with this main control member so that under no conditions can the furnace exceed a safe temperature, the system insuring that the burner in the furnace will substantially instantly respond to variations in temperature of the cold air returning to the furnace with the result that if cold air leaks in or enters the house from any cause, as for example when the door is opened, it immediately seeks the lowest point and flows down the cold air return, substantially instantly increasing the flame at the burner or burners in the furnace.

Further objects are to provide a heating system in which compensation is automatically obtained for variation in outside air temperature so that it is immaterial whether or not the outside air is extremely cold or is relatively mild, for the control of the furnace burner is obtained directly from the temperature of the cold air returning to the furnace so that if colder air returns to the furnace, a greater response is obtained and if milder air returns to the furnace, a lesser response is obtained so that there is an automatic compensation without any additional apparatus for variations in temperature of the outside air.

Further objects are to provide a system which is so made that substantially instant response at the furnace is obtained when any register is opened or closed in any room of the house. Obviously when the register is suddenly opened in a room that was not heretofore heated, the previously stagnant cold air in that room will pass down the cold air return from the room directly to the main cold air return of the furnace and thus arrive at the control member in the main cold air return and cause a compensating adjustment of the burners to take care of this additional heating load. On the other hand, if a register is shut off in any room in the house, the flow of air returning from that room is materially lessened so that the temperature in the cold air return will vary and thus substantially instantly vary the response from the control member in the main cold air return, thus automatically compensating for variations in heating load that are from time to time placed upon the furnace.

Further objects are to provide a system which is applicable to any arrangement of house, irrespective of the manner in which the rooms, doors or windows are positioned in the house, the system insuring substantially instantaneous response to variations in temperature of the returning air to the furnace.

An embodiment of the invention is shown in the accompanying drawing, in which.

Figure 1:
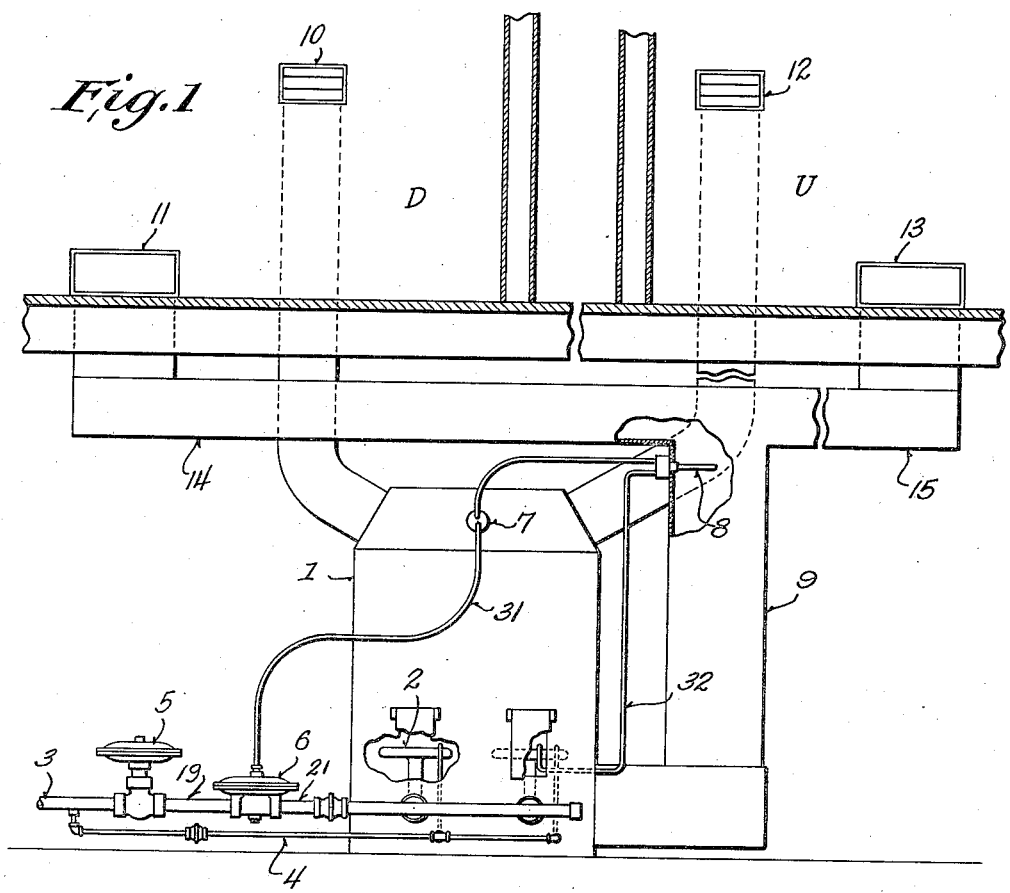
Figure 1 is a diagrammatic view showing a fragment of a house with the burner and control system installed, parts being broken away and in section.

Referring to Figure 1, it will be seen that a hot air furnace has been indicated at 1 and is provided with one or more burners 2 which may be supplied from the gas mains 3. The pilot supply pipe is indicated at 4, the pressure regulator at 5 and the floating throttle valve at 6. The limit control in the bonnet of the furnace is indicated by the reference character 7 and the main control member 8 is shown as positioned in the main cold air return 9.

The diagrammatic view of Figure 1 indicates a fragment of a downstairs room by the reference character D and a fragment of an upstairs room by the reference character U. Each of the rooms is preferably provided with a hot air register or discharge opening and with a cold air register return. The hot air register for the lower room is indicated by the reference character 10 and the cold air return register by the reference character 11. Similarly the hot air register for the upstairs room is indicated by the reference character 12 and the cold air register for such upstairs room by the reference character 13.

The cold air returns through different portions of the house, for example the cold air returns 14 and 15, lead to the main cold air return 9 and thus return to the furnace.

Figure 2:
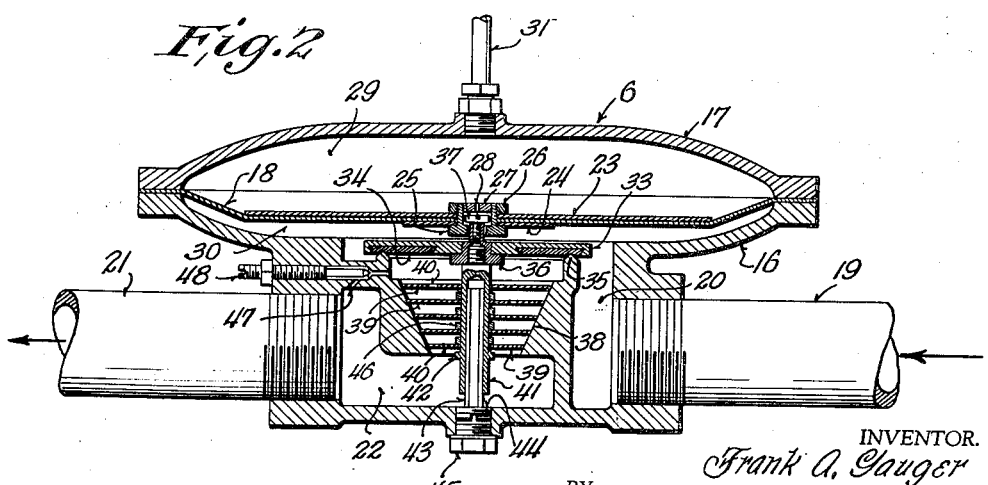
Figure 2 is a sectional view through the floating throttle valve.

The floating throttle valve is illustrated in Figure 2 and may take the form of that disclosed in my copending application Serial No. 37,673 filed August 24, 1935 for Automatic valve and system of control therefor. This valve provides a main valve and a throttling valve and a minimum flame adjustment. In the form chosen for illustration the valve is composed of a lower casing member 16 and an upper casing member 17 between which a diaphragm 18 is clamped. The supply pipe 19 opens into the cavity 20 in the lower casing 16 and the outlet pipe or discharge pipe 21 opens into the cavity 22 in the lower casing. The diaphragm is backed by a fairly large upper metal disk 23 and a much smaller lower metal disk 24. These disks are clamped together by means of the sleeve like threaded member 25 and the clamping nut 26. A plug 27 is screwed or otherwise secured within the hollow sleeve 25 and is provided with a small bleed aperture 28 which is adapted to supply gas under pressure to the upper chamber 29 above the diaphragm, the lower chamber 30 below the diaphragm being constantly subjected to the gas pressure from the supply pipe 19. The upper chamber 29 communicates by means of the pilot bleed pipe 31 with the limit control 7 and with the main control 8 and from thence passes by way of the exhaust pipe 32 into the combustion chamber of the furnace as indicated in Figure 1.

The pressure in the upper chamber 29 is supplied by the gas passing through the bleed opening 28, see Figure 2, and this pressure is either partially or wholly relieved through the relatively larger pilot line 31 under the control of the members 7 and 8, the members 7 and 8 being preferably gas thermostats. These gas thermostats 7 and 8 each comprise a valve in the pilot line 31 and thermostatic means which is effective to open the valve as the temperature to which the thermostatic means is responsive, falls below a predetermined value.

The valve portion proper comprises a main valve 33 which may be provided with a suitable gasket 34 and seats upon the valve seat 35. It has a fitting 36 screwed into it and extending upwardly therefrom and passing loosely into the sleeve like member 25. There is considerable clearance between the sleeve like member and the upper portion of the fitting 36 so that gas may freely pass to the bleed opening 28. A headed screw 37 is screwed into the upper portion of the fitting 36 and is positioned between the plug 27 and the partially closed end of the sleeve 25 so that there is lost motion or play between the head of the screw 37 and the diaphragm and consequently lost motion or play between the diaphragm and the main valve so that a limited amount of relative motion is afforded.

The valve also comprises a conical valve seat 38 which cooperates with a plurality of disks 39. These disks are of gradually decreasing size from the upper to the lowermost disk and are adapted to seat upon the conical valve seat 38. The disks are provided with apertures 40 which are arranged in a graded manner; for example the smallest aperture is in the lowest and smallest disk and the largest aperture in the largest or uppermost disk, the other apertures being graduated in the regular sequence.

A sleeve 41 is provided with a reduced upper portion screwed into the fitting 36 and consequently is carried by the main valve 33. This sleeve passes loosely through the successive disks 39 and is provided with a lower integral collar 42. The sleeve is guided loosely by a hexagonal pin or guide member 43 which is provided with a lower threaded portion 44 screwed into an aperture in the lower casing member 16, the aperture being closed by a plug 45. A series of spacing collars 46 are positioned between successive disks and are loosely and slidably mounted on the sleeve 41.

The conical valve seat 38 and the series of disks 39 with their graduated openings constitute a throttle valve and it is apparent that when the main valve is closed, all communication from the supply pipe 19 to the throttle valve is cut off. It is also clear that if the diaphragm moves upwardly for a full stroke, it will lift all of the disks from closed position and as it moves down the first disk to contact with its seat will be the uppermost disk and thereafter the next disk, and so on, until the last disk or smallest bottom disk contacts with the seat. In view of the apertures 40 through the disks being of substantially decreasing size from the largest disk to the smallest disk, it is apparent that a throttling action occurs.

It is also apparent that in opening the valve the lowermost disk will first be opened and thereafter the lowermost spacing collar 46 will engage the next disk and lift it from the seat, and so on, until all of the disks are raised. The valve, therefore, provides a graduated control for the gas flow and this throttling valve is wholly cut off whenever the main valve is closed. Even when all of the disks are seated a small amount of gas can pass through the lowermost of the apertures 40 in the bottom disk.

Minimum flow means is provided by the passageway 47 and this minimum flow is adjusted by means of the needle valve 48 so that manually adjustable minimum flow means is furnished, the minimum flow passage however leading from below the main valve to the chamber 22 of the casting 16 so that the minimum flow means is completely cut off when the main valve is closed. It is to be noted particularly that the main valve when fully closed cuts off all gas pressure from both the throttling valve and from the minimum supply means.

The operation of the valve is as follows:

Assume that the gas thermostat 8 calls for an increase in temperature and that the limit control 7 is not calling for a shut down. The pressure above the diaphragm is relieved and the diaphragm tries to lift the main valve 33 from its seat. Finally when the pressure below the diaphragm is sufficiently greater than the pressure above the diaphragm, the main valve is lifted from its seat and this action is a quick motion as immediately upon the breaking of the seal between the main valve and the seat, pressure forms below the main valve and thus an additional thrust is suddenly provided, thereby producing a quick opening motion of the main valve.

In this quick opening motion after the main valve is actually opened, the diaphragm immediately encounters the additional load of one or two of the throttling disks or component parts of the throttling valve assembly. Consequently the diaphragm does not fully open the throttle valve with a complete full opening motion. Instead it partially opens this throttle valve. This is a great advantage as it prevents the snuffing out of a pilot light by a sudden rush of gas to the burner. This effect is noticed even with artificial gas but is very pronounced with natural gas.

If the pressure is completely relieved above the diaphragm, the diaphragm moves to its uppermost position and lifts all of the disks of the throttle valve assembly. If a lesser temperature is required, the diaphragm settles and the uppermost disk first seats, the remaining disks being held free of engagement with the tapered valve seat. This uppermost disk has the largest opening. However, if a still lesser temperature is called for, the diaphragm settles still farther and the next disk adjacent the uppermost disk engages the tapered valve seat. This disk has an opening therethrough of lesser diameter than that of the uppermost disk and consequently a greater throttling action occurs. As successive disks seat, greater and greater throttling action occurs. However, the minimum flame adjustment is such as to maintain the flame and prevent any chance of flash back, even if the throttle valve is completely closed and the gas has to pass through all of the openings in the disks, even including the smallest opening in the bottom disk.

If this minimum flame is still too much, the main valve closes with a quick motion. This quick motion results from the fact that as the main valve approaches its seat, the gas pressure below the main valve is relieved and this has the effect of a sudden downward thrust which insures quick closing of the main valve. The change in pressure above the diaphragm may be caused by a change in the controlling position of either of the gas thermostats 7 and 8. The operation was described above in connection with the controlling action of thermostat 8. Normally, the valve of thermostat 7 is substantially open so that it does not appreciably affect the control of the valve by thermostat 8. Whenever the temperature in the furnace bonnet, in which thermostat 7 is located, begins to rise above a predetermined value, however, the thermostat 7 begins to close off line 31, thus causing the diaphragm to move down and effect a further throttling of the gas. If this bonnet temperature rises sufficiently high, the pressure above the diaphragm 18 will be built up sufficiently high that valve disk 33 is quickly moved to closed position, thus completely interrupting the flow of gas to the burner. When the temperature to which thermostat 7 is responsive subsequently decreases, the pressure will be relieved above the diaphragm if the thermostat 8 is still calling for heat. This will permit the valve disk 33 to snap to its partially open position. As this temperature drops still more, the disks 39 will be successively picked up, thus gradually increasing the flow of gas to the burner until the amount of gas passing to the burner corresponds to the demand of thermostat 8.

It will be seen, therefore, that a quick opening and a quick closing main valve is provided and throttling is provided between the opened and closed positions of the main valve through a substantial range of motion of the mechanism.

Further when the main valve is closed, the throttling assembly, as well as the minimum flow means, is completely out of the range of the gas pressure.

It is to be noted also that this valve provides a gradual or graduated throttling and that the throttling assembly insures throttling through a wide range of motion of the mechanism and avoids, on the one hand, the requirement for a very delicate adjustment and, on the other hand, any possible fluttering during this throttling action. The thottling action is positive and the throttling mechanism is not dependent on any delicate adjustment of the mechanism or any extreme accuracy in machining.

Additionally it is to be noted that there is considerable play not only vertically but laterally between the main valve and the throttling valve so that the throttling valve may independently adjust itself to its seat or guides and no binding whatsoever can occur.

It will be seen, therefore, that substantially instantaneous adjustment of the furnace is provided by this invention, irrespective of the point at which the cold air leaks into the house and also irrespective of what additional load is placed on the furnace. Adjustment of the furnace to the needs is independent of variations in outside air temperature and the device operates equally well in mild weather as in severe weather.

It will be seen further that there is a substantially exact and substantially immediate balancing between the requirements for increased or decreased heat and that the adjustment of the furnace to the demands precludes any possibility of over shooting or any delay in the operation of the apparatus.

Although this invention has been described in considerable detail, it is to be understood that such description is intended as illustrative rather than limiting, as the invention may be variously embodied and is to be interpreted as claimed.

I claim:

1. In a gas fired heating system; a warm air furnace including a gaseous fuel burner; a plurality of supply ducts leading from said furnace to a plurality of spaces to be heated to convey heated air to said spaces; a plurality of return air ducts one communicating with each of said zones and all communicating with a common return air duct connected with said furnace; means for modulating the gas flow to said burner in accordance with the temperature in the common return air duct comprising a throttling burner valve controlling the flow of gas to said burner, a pressure motor comprising a movable wall operatively connected to said throttling valve, means for applying gas pressure to said pressure motor to cause said pressure motor to vary the position of said throttling valve, said last named means comprising a gas line and a pilot valve in said gas line remote from said pressure motor, means for applying a biasing force to said motor which is varied as said wall is moved continuously in one direction so that said main valve is modulated as said pilot valve is modulated, and a temperature responsive element in said common return air duct for variably positioning said pilot valve and consequently said throttling burner valve in accordance with the average temperature of the air returning through the individual return air ducts; a shut-off burner valve in series with said throttling valve and automatically movable abruptly between open and closed positions depending upon the value of a controlling condition, and adjustable bypass means for maintaining a minimum flow when said throttling valve is closed and while said shut-off valve is open.

2. In a gas fired heating system, a warm air furnace including a gaseous fuel burner, a plurality of supply ducts leading from said furnace to a plurality of spaces to be heated to convey heated air to said spaces, a plurality of return air ducts one communicating with each of said zones and all communicating with a common return air duct connected with said furnace, a shut-off burner valve and a throttling burner valve controlling the flow of gas to said burner, a pressure motor comprising a movable wall operatively connected to said valves, means for applying gas pressure to said pressure motor to cause said pressure motor to vary successively the positions of said shut-off and throttling valves, said last named means comprising a gas line and a pilot valve in said gas line remote from said pressure motor, means for applying a biasing force to said motor which is varied as said wall is moved continuously in one direction so that said main valve is modulated as said pilot valve is modulated, a temperature responsive element in said common return air duct for variably positioning said pilot valve and consequently said burner valve in accordance with the average temperature of the air returning through the individual return air ducts, and adjustable bypass means for maintaining a minimum flow when said throttling valve is closed and said shut-off valve is open.

3. In a gas fired heating system, a warm air furnace including a gaseous fuel burner; a plurality of supply ducts leading from said furnace to a plurality of spaces to be heated to convey heated air to said spaces; a plurality of return air ducts one communicating with each of said zones and all communicating with a common return air duct connected with said furnace; means for modulating the gas flow to said burner in accordance with the temperature in the common return air duct comprising a throttling burner valve controlling the flow of gas to said burner, a pressure motor comprising a movable wall operatively connected to said throttling valve, means for applying gas pressure to said pressure motor to cause said pressure motor to vary the position of said throttling valve, said last named means comprising a gas line and a pilot valve in said gas line remote from said pressure motor, means for applying a biasing force to said motor which is varied as said wall is moved continuously in one direction so that said main valve is modulated as said pilot valve is modulated, and a temperature responsive element in said common return air duct for variably positioning said pilot valve and consequently said throttling burner valve in accordance with the average temperature of the air returning through the individual return air ducts; a shut-off burner valve in series with said throttling valve and automatically movable abruptly between open and closed positions depending upon the value of a controlling condition, and adjustable means for maintaining a minimum flow independently of said throttling valve while said shut-off valve is open.

FRANK A. GAUGER.